No. 895,966. PATENTED AUG. 11, 1908.
E. COHEN.
PISTON.
APPLICATION FILED FEB. 24, 1908.
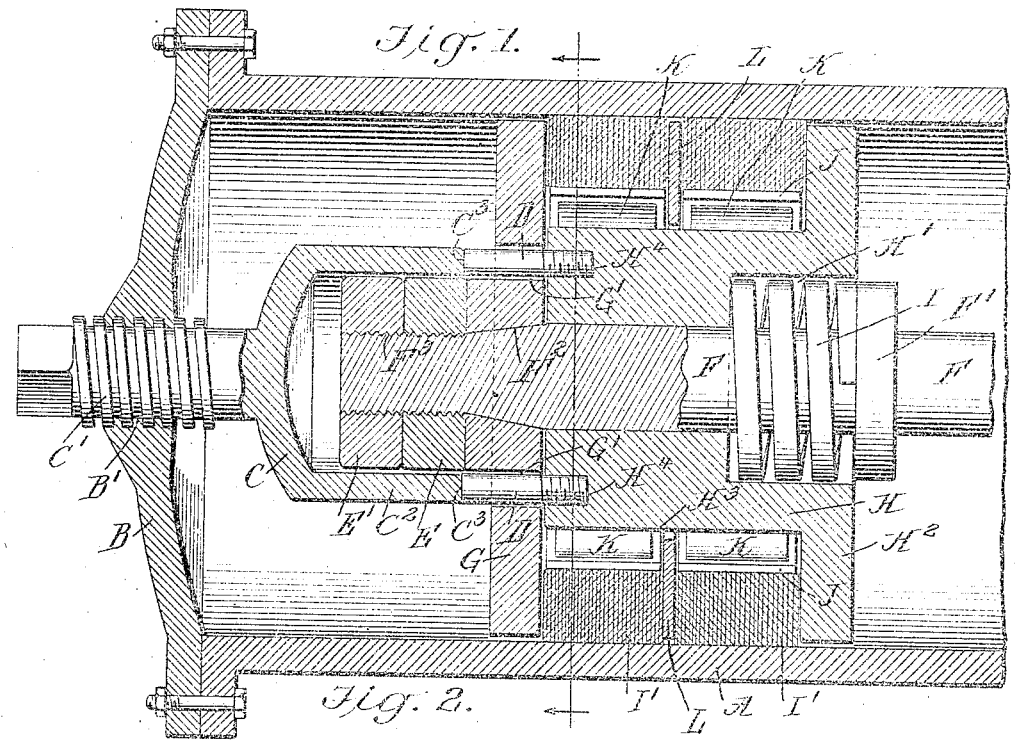
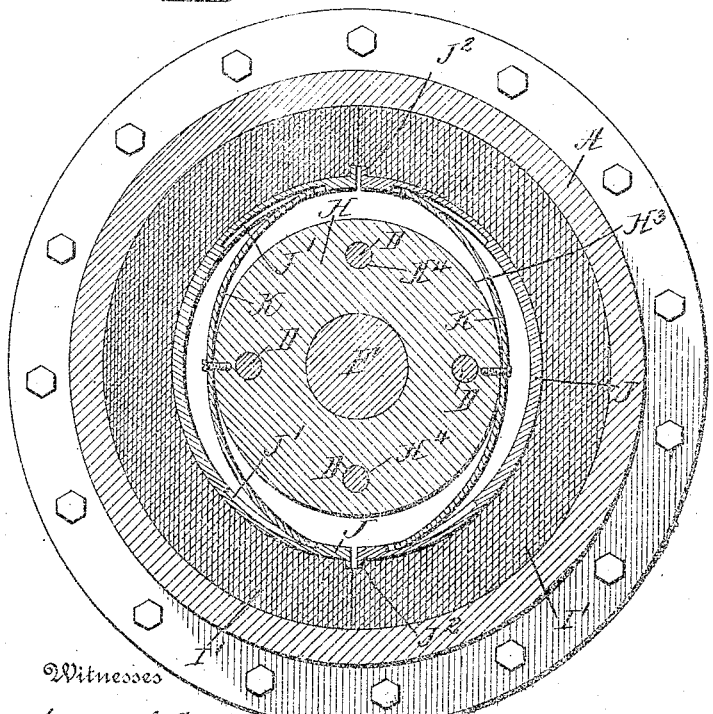
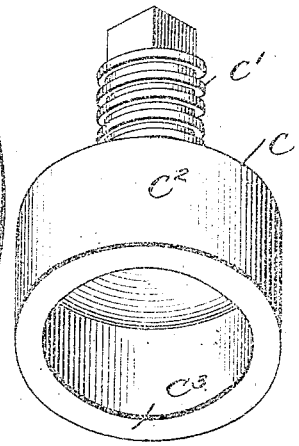
Witnesses
Inventor
EPHIE COHEN.
By Attorney

UNITED STATES PATENT OFFICE.

EPHIE COHEN, OF JOPLIN, MISSOURI.

PISTON.

No. 895,966.

Specification of Letters Patent.

Patented Aug. 11, 1908.

Application filed February 24, 1908. Serial No. 417,482.

*To all whom it may concern:*

Be it known that I, EPHIE COHEN, a citizen of the United States, and a resident of Joplin, in the county of Jasper and State of Missouri, have invented certain new and useful Improvements in Pistons, of which the following is a specification.

My invention is an improvement in pistons and particularly in the means for tightening up the packing thereof from time to time whenever desired without removing the piston from the cylinder and without opening the cylinder; and the invention consists in certain novel constructions and combinations of parts as will be hereinafter described and claimed.

In the drawing Figure 1 is a longitudinal section of a cylinder and piston embodying my invention. Fig. 2 is a cross-section thereof, and Fig. 3 is a detail perspective view of the abutment.

The cylinder A has its head B provided with a threaded opening B' in which screws the threaded shank C' of the abutment C which abutment is shown provided with a cup shaped body $C^2$ whose annular surface $C^3$ forms an abutment for the shifting devices of the piston presently described. These shifting devices are shown as pins D and the annular construction at $C^3$ of the abutment is preferred because it insures the engagement therewith by the pins D without regard to the position of the piston should the latter turn slightly within the cylinder. Moreover, the cup shape of the body $C^2$ receives the nuts E and E' on the piston rod F when the piston is moved into engagement with the abutment C in the operation of the invention.

The piston rod F is shouldered at F' and has at $F^2$ a tapered surface receiving the end plate G of the piston and is also threaded at $F^3$ to receive the nut E by which the plate G may be forced up the tapered or inclined surface $F^2$ and the jam nut E' for securing the nut E when properly seated. The piston has a body H recessed in one end at H' to receive a spring I and also to receive the shoulder F' in certain positions of the parts and this body H has the end flange $H^2$ opposite the end plate G, is provided also with the circumferential surface $H^3$ to receive the packing and spring devices and the said body H is also provided with the threaded sockets $H^4$ in which are screwed the pins D which pins project through the openings G' in the plate G and protrude beyond the said plate for engagement with the abutment C, as will be understood from the drawings.

The packing I' which may be of canvas is placed on the piston body and bearing or supporting plates J are arranged within the packing strips I' and receive the pressure of the springs K, which springs are secured between their ends to the piston body and bear at their ends against the inner sides of the plates J being preferably seated in recesses J' in the plates J in such manner as to prevent any shifting rotarily of the plates J relatively to the body H. The plates J are also provided at their ends with outwardly turned flanges $J^2$, which flanges $J^2$ project at the ends of the packing strips I' and prevent any shifting of said strips in rotary direction. I prefer in practice to divide the packing devices into sections by means of an intermediate partition L, as best shown in Fig. 1 of the drawing.

In the operation of the invention when the plates G and $H^2$ bear tightly on the opposite sides of the packing strips and the latter become worn they will be held by the end plates G and $H^2$ from adjusting outwardly to secure the fit within the cylinder and in such case it ordinarily becomes necessary to open the cylinder and remove the piston in order to relieve the pressure and permit the springs to readjust the packing. By my invention, it will be noticed the plates G and $H^2$ are pressed toward each other by the action of the spring I and are held tightly on opposite sides of the packing by such means. Therefore in order to free the parts and permit the springs K to act expansively to spread the packing in the cylinder whenever desired, I provide means within the cylinder hereby to relieve the tension of the spring I and spread the plates G and $H^2$ apart so the springs K may operate as desired.

In the use of the invention when the piston is operating properly the abutment C may be adjusted toward the end of the cylinder B and out of the path of the piston. If, now, it is desired to free the piston from the action of the spring I, the abutment may be adjusted to set its surface $C^3$ toward the piston and to the position in which the pins D will engage the abutment C at the end of the stroke of the piston. In so doing the pins D will be pushed back carrying with them the body H of the piston against the tension of the spring I, this spreading of the plates G and $H^2$ apart, freeing the packing and the packing actuating springs and permitting the latter to operate to force the packing out to a tight fit within the cylinder as desired.

The construction is simple, easily operated and permits the adjustment of the piston packing without opening the cylinder.

It will be understood that in practice the invention is especially designed for use at the water end of a steam operated pump; but may be used in other locations where pistons are utilized.

I claim—

1. The combination substantially as described of a cylinder having its head provided with a threaded opening, an abutment having a stem screwed in said opening and a cup shaped body portion having an annular surface for engagement by the shifting devices, a piston rod having a threaded end and nuts thereon and also having a shoulder forming a bearing for a spring, a spring bearing at one end against said shoulder, a piston having a body provided with a recess receiving said spring and having at the end adjacent to said recess an end plate or flange, a plate opposite said end plate and provided with openings for the shifting pins, shifting pins projecting from the piston body through said openings and protruding beyond said end plate for engagement with the abutment, packing on the piston body, and spring devices for forcing said packing outwardly, all substantially as set forth.

2. The combination of a cylinder, a piston having packing, and springs for actuating the same, and plates on the opposite sides of the packing and springs and movable relatively apart, and means within the cylinder whereby said plates may be shifted apart to permit the packing springs to operate upon the packing, substantially as set forth.

3. The combination of a cylinder, a piston having packing and springs for actuating the same, and plates on opposite sides of the packing and springs and movable relatively apart, and means within the cylinder whereby said plates may be shifted apart to permit the packing springs to operate upon the packing, said means having a device projecting outside of the cylinder whereby it may be operated from without the cylinder and without the opening of the cylinder, substantially as set forth.

4. The combination of a piston rod, a piston thereon and having plates or sections movable apart, a spring operating to actuate said sections toward each other, and shifting devices operating in opposition to said spring to spread the sections, and spring actuated packing on the piston, substantially as set forth.

5. The combination of a piston rod having a shoulder, a piston body fitting on the rod and having a recess adjacent to said shoulder, and a spring therein and bearing between the shoulder and piston body, an end plate supported from the piston body, pins projecting from the piston body through said end plate, an abutment for engagement by said pins whereby the piston body may be forced away from the end plate, and spring actuated packing on the piston body, substantially as set forth.

6. The combination of the piston rod, a piston body thereon, an end plate, said plate and body being movable relatively, a spring actuating said plate and body toward each other, pins projecting from the body through the end plate, an abutment adjustably supported on the cylinder, and spring actuated packing on the piston body, substantially as set forth.

7. The combination of a cylinder, a piston having spring actuated packing and plates at the ends thereof and movable relatively toward and from each other, shifting devices whereby said parts may be moved apart, a spring pressing said parts normally toward each other, and an abutment adjustably supported in the cylinder for engagement by the shifting devices, substantially as set forth.

8. A piston having a spring actuated packing, and plates at the opposite ends thereof and movable relatively toward each other and apart, a spring for pressing the said plates toward each other and shifting devices whereby the plates may be forced apart to permit the spreading of the packing between the said plates, substantially as set forth.

9. The combination of the cylinder, a piston therein and having spring actuated packing, plates on opposite sides thereof and movable relatively apart and a shifting device operated from without the cylinder whereby to spread the plates on opposite sides of the packing, substantially as set forth.

EPHIE COHEN.

Witnesses:
SOLON C. KEMON,
PERRY B. TURPIN.